United States Patent [19]

Vette

[11] 4,442,912

[45] Apr. 17, 1984

[54] TILT-CAB TRUCK INCLUDING APPARATUS TO SECURE UNIFORM ADVANCE AND RETRACTION OF THE TILT CYLINDERS

[75] Inventor: Friedrich Vette, Holland, Netherlands

[73] Assignee: Applied Power Inc., Milwaukee, Wis.

[21] Appl. No.: 397,682

[22] Filed: Jul. 13, 1982

[51] Int. Cl.³ .................. B62D 33/06; F15B 11/05; F15B 13/02; F15B 20/00
[52] U.S. Cl. ................................. 180/89.15; 91/430; 91/534; 296/190
[58] Field of Search .................. 180/89.15; 296/190; 254/93 R; 91/420, 31, 534, 536

[56] References Cited

U.S. PATENT DOCUMENTS

| | | | |
|---|---|---|---|
| 3,255,587 | 6/1966 | London | 91/31 X |
| 3,439,583 | 4/1969 | Stacey | 91/420 |
| 3,472,547 | 10/1969 | London | 296/190 |
| 3,761,123 | 9/1973 | Neill et al. | 180/89.15 X |
| 3,990,583 | 11/1976 | Nishida et al. | 212/164 |

Primary Examiner—Joseph F. Peters, Jr.
Assistant Examiner—Mitchell J. Hill
Attorney, Agent, or Firm—John J. Byrne

[57] ABSTRACT

Disclosed is a tilt-cab truck including apparatus to secure uniform advance and retraction of the tilt cylinders. The system employs a single pilot-operated check valve instead of the conventional two pilot-operated check valves, but it employs two extra check valves to provide the same system safety as is conventionally provided with two pilot-operated check valves.

3 Claims, 4 Drawing Figures

TILT-CAB TRUCK INCLUDING APPARATUS TO SECURE UNIFORM ADVANCE AND RETRACTION OF THE TILT CYLINDERS

FIELD OF THE INVENTION

This invention relates to tilt-cab trucks. In particular, it relates to tilt-cab trucks having plural tilt cylinders and apparatus for securing uniform advance and retraction of the tilt cylinders.

BACKGROUND OF THE INVENTION

In tilt-cab trucks having plural (usually dual) tilt cylinders with a pilot-operated check valve in each cylinder, generally one of the cylinders will advance or retract more rapidly than the other(s), even when the loads on both or all cylinders are equal or about equal. This undesirable effect appears to be caused by the unsynchronous reactions of the pilot operated check valves.

OBJECTS OF THE INVENTION

It is the general object of the invention to eliminate or minimize non-synchronous advance and retraction of the tilt cylinders in tilt-cab trucks having plural tilt cylinders.

It is another major object of the invention to obtain the first-mentioned object with the same safety in the case of hydraulic line failure as is present in the case of conventional systems having two pilot-operated check valves.

Other objects and advantages of the invention will become apparent from the description of the presently preferred embodiment thereof given hereinafter.

SUMMARY OF THE INVENTION

A tilt cab truck according to the present invention includes a chasis, a cab mounted on the chasis and pivotable with respect to the chasis about an axis, first and second hydraulic jacks for tilting the cab about the axis back and forth between a lowered first position and a raised second position, a control valve for selectively applying hydraulic fluid to the push sides of the hydraulic jacks, a first path of fluid communication connecting the control valve to the push side of the first hydraulic jack, a pilot-operated check valve disposed in the first path of fluid communication believes the control valve and the push side of the first hydraulic jack, a second path of fluid communication connecting the push side of the second hydraulic jack to the first path of fluid communication at a first point between the control valve and the pilot-operated check valve, a first check valve disposed in the second path of fluid communication so as to permit flow towards the push side of the second hydraulic jack but to prevent flow in the opposite direction, a third path of fluid communication connecting the first path of fluid communication at a second point between the pilot-operated check valve and the push side of the first hydraulic jack to the second path of fluid communication at a third point between the first check valve and the push side of the second hydraulic jack, and a second check valve disposed in the third path of fluid communication so as to permit flow towards the push side of the first hydraulic jack but to prevent flow in the opposite direction.

DETAILED DESCRIPTION OF THE PRESENTLY PREFERRED EMBODIMENT

Figure 1:
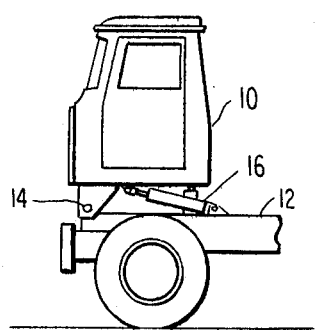
FIG. 1 shows a tilt cab truck which embodies the subject invention.

FIG. 1 show a tilt cab truck which embodies the subject invention. A cab 10 is mounted on a chassis 12 and pivotable with respect to the chassis 12 about an axis 14. Hydraulic jacks 16 and 18 are provided to tilt the cab 10 about the axis 14 back and forth between a lowered first position and a raised second position.

Figure 2A:
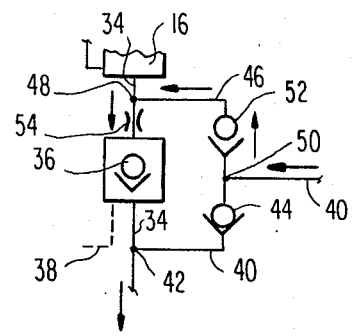
FIG. 2A shows a portion of the hydraulic circuitry in position for fluid to return to the reservoir during retraction of the hydraulic jacks.
Figure 2:
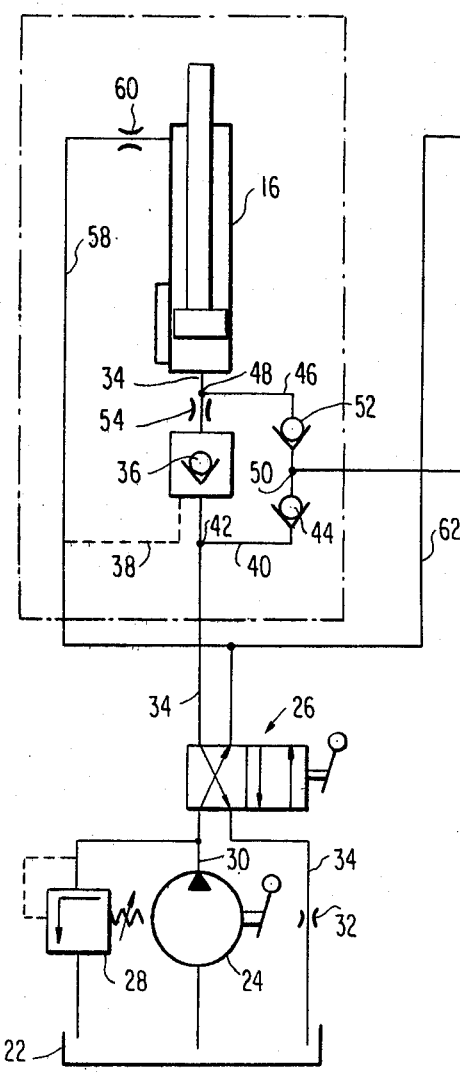
FIG. 2 shows the hydraulic circuitry for the hydraulic jacks 16 and 18 in schematic form.
Figure 3:
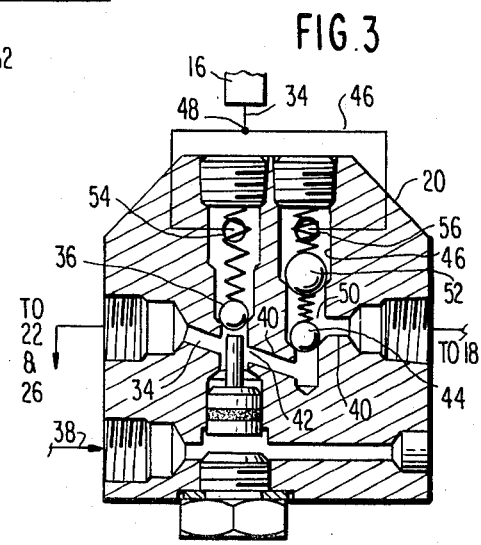
FIG. 3 shows a portion of the hydraulic circuitry in structural form.

FIG. 2 shows the hydraulic circuitry for the hydraulic jacks 16 and 18 in schematic form, and FIG. 3 shows a portion of the hydraulic circuitry which may be and (preferably is) incorporated into the base 20 of the hydraulic jack 16. The hydraulic circuitry includes a reservoir 22 for hydraulic fluid, a pump 24 for pumping hydraulic fluid to the hydraulic jacks 16 and 18, and a control valve 26 for selectively directing hydraulic fluid to the push or the pull sides of the hydraulic jacks 16 and 18. An overpressure relief valve 28 is provided in the hydraulic line 30 between the pump 24 and the control valve 26 for venting overpressures to the reservoir 22, and a fluid restrictor 32 is provided in the hydraulic line 34 between the control valve 26 and the reservoir 22.

A first path of fluid communication 34 connects the control valve 26 to the push sides of the hydraulic jack 16. A pilot operated check valve 36 is disposed in the first path of fluid communication 34 between the control valve 26 and the push side of the hydraulic jack. The check valve 36 is selectively operable by pilot pressure from a line 38 as shown in FIG. 3. A second path of fluid communication 40 connects the push side of the hydraulic jack 18 to the first path of fluid communication 34 at a first point 42 between the control valve 26 and the pilot operated check valve 36. A first check valve 44 is disposed in the second path of fluid communication 40 so that it permits flow towards the push side of the hydraulic jack 18 but prevents flow in the opposite direction. A third path of fluid communication 46 connects the first path of fluid communication 34 at a second point 48 between the pilot operated check valve 36 and the push side of the hydraulic jack 16 to the second path of fluid communication 40 at a third point 50 between the check valve 44 and the push side of the hydraulic jack 18. A second check valve 52 is disposed in the third path of fluid communication 46 so that it permits flow towards the push side of the hydraulic jack 16 but prevents flow in the opposite direction. Preferably, a first flow restrictor 54 is provided in the first path of fluid communication between the pilot operated check valve 36 and the point 48, and a second flow restrictor 56 is provided in the second path of fluid communication 40 between the point 50 and the push side of the hydraulic jack 18.

While a regenerative system has been illustrated, it will be recognized that the description of the invention up to this point would be equally applicable to a conventional (i.e., non-regenerative) circuit as well. If, however, the system is regenerative, then it preferably additionally includes a fourth path of fluid communication 58 connecting the control valve 26 to the pull side of the hydraulic jack 16, a third flow restrictor 60 in the fourth path of fluid communication 58, a fifth path of fluid communication 62 connecting the control valve 26 to the pull side of the hydraulic jack 18, and a fourth flow restrictor 64 in the fifth path of fluid communication 62.

The operation of the invention may be understood from FIG. 2A, which shows the normal flow path of fluid returning to the reservoir 22 during retraction of the hydraulic jacks 16 and 18. Fluid from the hydraulic jack 16 flows through the first path of fluid communication 34, including the fluid restrictor 54 and the check valve 36 (which has been opened by pilot pressure applied to it via the line 38). Fluid from the hydraulic cylinder 18 flows through the second path of fluid communication 40 to the point 50. Further flow through the second path of fluid communication is blocked by the first check valve 44. However, from the point 50 fluid from the hydraulic jack 18 flows through the third path of fluid communication 46, through the open check valve 52, to join the first path of fluid communication 34 at the point 48. From there it flows to the reservoir 22 through the first path of fluid communication 34 in the same fashion as hydraulic fluid from the hydraulic jack 16.

In the case of a failure in the first path of fluid communication 34, the check valves 36 and 44 secure the system. In the case of a failure in the second path of fluid communication 40, the check valves 36 and 52 secure the system. (Although the hydraulic jack 18 may lose its hydraulic fluid, the hydraulic jack 16 will still hold the load until repairs can be effected.)

Caveat

While the present invention has been illustrated by a detailed description of a preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

I claim:
1. A tilt-cab truck comprising:
   (a) a chassis;
   (b) a cab mounted on said chassis and pivotable with respect to said chassis about an axis;
   (c) first and second hydraulic jacks for tilting said cab about said axis back and forth between a lowered first position and a raised second position;
   (d) a control valve for selectively applying hydraulic fluid to the push sides of said hydraulic jacks;
   (e) a first path of fluid communication connecting said control valve to the push side of said first hydraulic jack;
   (f) a pilot-operated check valve disposed in said first path of fluid communication between said control valve and the push side of said first hydraulic jack;
   (g) a second path of fluid communication connecting the push side of said second hydraulic jack to said first path of fluid communication at a first point between said control valve and said pilot-operated check valve;
   (h) a first check valve disposed in said second path of fluid communication, said first check valve permitting flow towards the push side of said second hydraulic jack but preventing flow in the opposite direction;
   (i) a third path of fluid communication connecting said first path of fluid communication at a second point between said pilot-operated check valve and the push side of said first hydraulic jack to said second path of fluid communication at a third point between said first check valve and the push side of said second hydraulic jack; and
   (j) a second check valve disposed in said third path of fluid communication, said second check valve permitting flow towards the push side of said first hydraulic jack but preventing flow in the opposite direction.

2. A tilt cab truck as recited in claim 1 and further comprising:
   (a) a first flow restrictor in said first path of fluid communication between said pilot operated check valve and said second point and
   (b) a second flow restrictor in said second path of fluid communication between said third point and the push side of said second hydraulic jack.

3. A tilt cab truck as recited in claim 1 or claim 2 and further comprising:
   (a) a fourth path of fluid communication connecting said control valve to the pull side of said first hydraulic jack;
   (b) a third flow restrictor in said fourth path of fluid communication;
   (c) a fifth path of fluid communication connecting said control valve to the pull side of said second hydraulic valve; and
   (d) a fourth flow restrictor in said fifth path of fluid communication.

* * * * *